(12) United States Patent
Wu et al.

(10) Patent No.: US 7,379,401 B2
(45) Date of Patent: May 27, 2008

(54) DEVICE AND METHOD FOR CONNECTING INTERRUPTED RECORDING

(75) Inventors: Wen-Yi Wu, Hsin-Chu (TW); Hong-Ching Chen, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 575 days.

(21) Appl. No.: 10/639,808

(22) Filed: Aug. 13, 2003

(65) Prior Publication Data
US 2004/0109398 A1 Jun. 10, 2004

(30) Foreign Application Priority Data
Dec. 5, 2002 (TW) ............................... 91135241 A

(51) Int. Cl.
*G11B 7/00* (2006.01)
(52) U.S. Cl. .................... 369/47.3; 369/47.31
(58) Field of Classification Search .................. None
See application file for complete search history.

(56) References Cited

U.S. PATENT DOCUMENTS

| | | | |
|---|---|---|---|
| 6,198,707 B1 | 3/2001 | Yamamoto | |
| 6,324,136 B1 | 11/2001 | Yoshida et al. | |
| 6,418,099 B2 | 7/2002 | Yamamoto | |
| 6,754,148 B2 * | 6/2004 | Kim | 369/47.31 |
| 2001/0001265 A1 | 5/2001 | Yamamoto | |
| 2001/0006495 A1 | 7/2001 | Hayashi et al. | |
| 2001/0006496 A1 | 7/2001 | Hayashi et al. | |
| 2001/0006499 A1 * | 7/2001 | Hayashi et al. | 369/47.34 |
| 2002/0018415 A1 | 2/2002 | Kurada et al. | |
| 2002/0048240 A1 | 4/2002 | Pan et al. | 369/47.31 |
| 2002/0060961 A1 | 5/2002 | Yamamoto | |
| 2002/0089907 A1 | 7/2002 | De Kimpe et al. | |
| 2002/0101793 A1 | 8/2002 | Sakata | |
| 2002/0101803 A1 | 8/2002 | Hayashi et al. | 369/47.3 |
| 2003/0095479 A1 | 5/2003 | Shimoi et al. | 369/47.3 |
| 2003/0169657 A1 | 9/2003 | Ishitobi et al. | 369/47.31 |

* cited by examiner

*Primary Examiner*—Wayne Young
*Assistant Examiner*—Lixi Chow
(74) *Attorney, Agent, or Firm*—Banger Shia

(57) ABSTRACT

This invention provides an optical storage device for recording a plurality of data onto an optical storage medium. If recording interrupted, the optical storage device generates a data-interrupted address, and re-connects the interrupted data with a data re-connecting physical address. The optical storage device comprises a physical addressing module, a record-interrupt generator, a data recording controller, a data-interrupt address generator, and a data-reconnecting physical address generator. The physical addressing module provides a reference physical address for recording data onto the optical storage medium. When detecting the interrupt of data recording, the data-interrupt address generator generates the address of the interrupted data. According to the address of the interrupted data, the data-reconnecting physical address generator generates a data-reconnecting physical address. The optical storage device utilizes the data-reconnecting physical address to continue to record the interrupted data onto the optical storage medium.

23 Claims, 13 Drawing Sheets

DEVICE AND METHOD FOR CONNECTING INTERRUPTED RECORDING

BACKGROUND OF THE INVENTION

1. Field of the Invention

The present invention relates to an optical recording device for recording a plurality of data onto an optical storage medium. In particular, the optical recording device can generate a data-interrupt address when recording is interrupted, and then continue to reconnect the interrupted data from a data-reconnecting physical address.

2. Description of the Prior Art

The optical recording system is developing with the trend towards high recording/reading speed, and high memory capacity.

Optical recording devices, such as conventional CD-R/RW and DVD-R/RW recorders, are used to record data onto corresponding optical storage medium, such as various types of CD, VCD and DVD recordable disks). During recording, some shock error or abnormal condition may occur to interrupt recording and the interrupted data cannot be correctly reconnected. As a result, recording is failed. In the system with high recording/reading speed, particularly, errors may occur when reconnecting and reading data after data recording is interrupted. Therefore, it is an important issue to reduce errors in data reconnection and consequently reduce read errors.

It is therefore a primary objective of the present invention to provide a method for generating a data-interrupt address when recording interrupted and then continuing to reconnect the interrupted data from a data-reconnecting physical address, to solve the above-mentioned problem.

SUMMARY OF THE INVENTION

Accordingly, an objective of the present invention is to provide a method and an optical recording apparatus to generate a data-interrupted address when data recording is interrupted and to reconnect the interrupted data from a data-reconnecting physical address, so as to continue to reconnect the interrupted data from the data-reconnecting physical address, which enables further correct reading.

The present invention relates to an optical recording device for recording a plurality of data on an optical storage medium. The optical recording device can generate a data-interrupt address when recording interrupted, and then continue to reconnect the interrupted data from a data-reconnecting physical address so as to enable further correct reading of the interrupted data. The optical recording device comprises a physical addressing module, a recording-interrupt generator, a data recording controller, a data-interrupt address generator, and a data-reconnecting physical address generator. The physical addressing module provides a reference physical address corresponding to a predetermined physical address on the optical storage medium. When detecting a recording-interrupt event, the recording-interrupt generator correspondingly generates a recording-interrupt signal. The data-interrupt address generator generates the data-interrupt address when recording interrupted. The data-reconnecting physical address generator generates the data-reconnecting physical address according to the data-interrupt address, so as to enable the data recording controller, while starting to reconnect the interrupted data, to utilize the data-reconnecting physical address as a starting physical address to record the interrupted data on the optical storage medium.

According to the present invention, the optical recording device records a plurality of data onto the optical storage medium. When data recording is interrupted, the data-interrupt address generator can generate the data-interrupt address, and the data-reconnecting physical address generator can generate the data-reconnecting physical address according to the data-interrupt address, to enable reconnect the interrupted data from the data-reconnecting physical address. Therefore, the present invention prevents incorrect reconnection when data recording is interrupted.

The advantage and spirit of the invention may be understood by the following recitations together with the appended drawings.

BRIEF DESCRIPTION OF THE APPENDED DRAWINGS

DETAILED DESCRIPTION OF THE INVENTION

For various types of optical storage medium, e.g. disks of CD-R/RW, DVD+R/RW and DVD-R/RW, digital data are recorded in a spiral-shaped pre-groove on the optical storage medium. The pre-groove is wobbly and the wobble frequency can be used to control the recording speed. The pre-groove on the optical storage medium comprises address information corresponding to a location on the optical storage medium. Such address information is called physical address and used for ensuring data to be recorded in correct positions on the optical storage medium.

For a DVD disc, for example, the recorded data has four types of data structure unit, including channel bit, data frame, data sector, and ECC block (error correction code block). Channel bit is the smallest recording unit on the disc. One byte data can be modulated into 16 channel bits with EFM+ (Eight to Fourteen Modulation Plus) modulation and then be recorded on the disc. EFM+ allows the continuous extend of the same signal status in a channel bit to be no more than 11 bits and no less than 3 bits. Each 1456 channel bits plus 32 bits data frame sync for total 1488 channel bits are constructed into a data frame. The data frame sync comprises 14 continuous bits in a same signal status to distinguish from the normal EFM+ modulated channel bits. Twenty-six data frames form a data sector. Data sector is the smallest logical data unit for the DVD disc. The first four data bytes in a data sector store the ID of the data sector, so called sector ID. If the disc is already recorded with data, the sector ID and the data frame sync can be used to locate an address corresponding to the recorded data on the disc, such address is called logical address. The definition and distinction of physical address and logical address on the disc are known to those people skilled in the art. And more information can be found from the related Data Book. Before recording onto the disc, data are processed with related error correction code (ECC) to allow read errors to be corrected.

Figure 1:
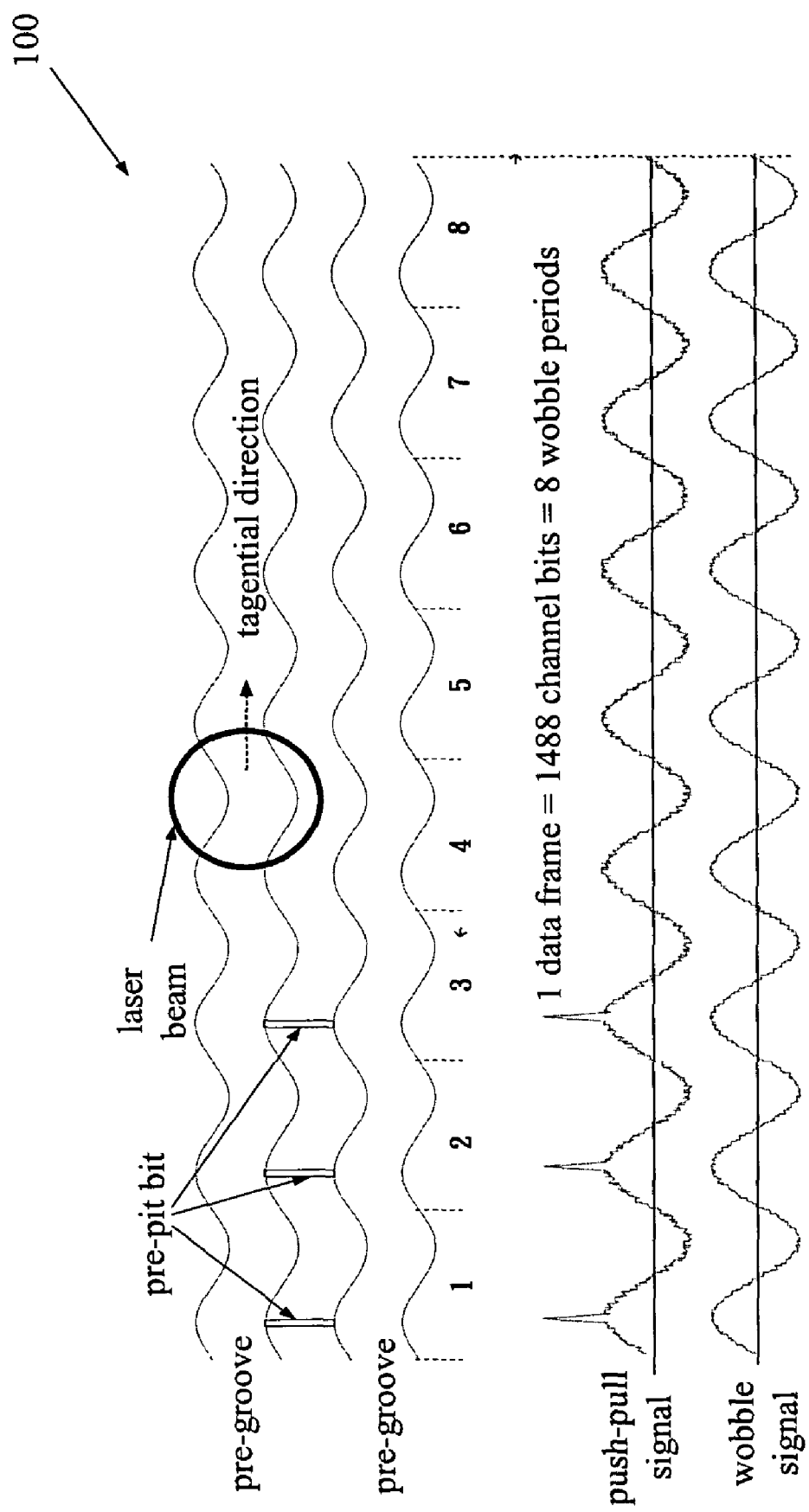
FIG. 1 is the pre-groove format and related signals of an optical storage medium in DVD-R/RW format.

Referring to FIG. 1, FIG. 1 is the pre-groove format and related signals of an optical storage medium 100 in DVD-R/RW format. An optical storage medium of DVD-R/RW 100 comprises a plurality of data tracks for storing data. The data tracks comprise a plurality of pre-grooves. The pre-groove is wobbly, and signals obtained have a wobble period for 186 channel bits. A data frame comprises 8 wobble periods, equivalent to 1488 channel bits. In the first three wobble periods of each even data frame, there are pre-pit bits in between the adjacent pre-grooves for storing the physical block address of the pre-groove. The pre-pit bit in the first wobble period appears constantly, which is called the pre-pit sync bit.

The optical recording device (e.g. DVD recorder) comprises a laser pickup head that comprises a laser diode and a photo-detector. When the optical recording device reads data on an optical storage medium (e.g. DVD recordable disc), the laser pickup head emits a laser beam to the pre-groove, and then the photo-detector detects the difference of the reflected signals from both sides of the tangential direction of the optical storage medium to extract a push-pull signal. From the push-pull signal, a wobble signal of the pre-groove can be extracted and the related physical address pre-grooved on the optical storage medium can be detected.

Figure 2:
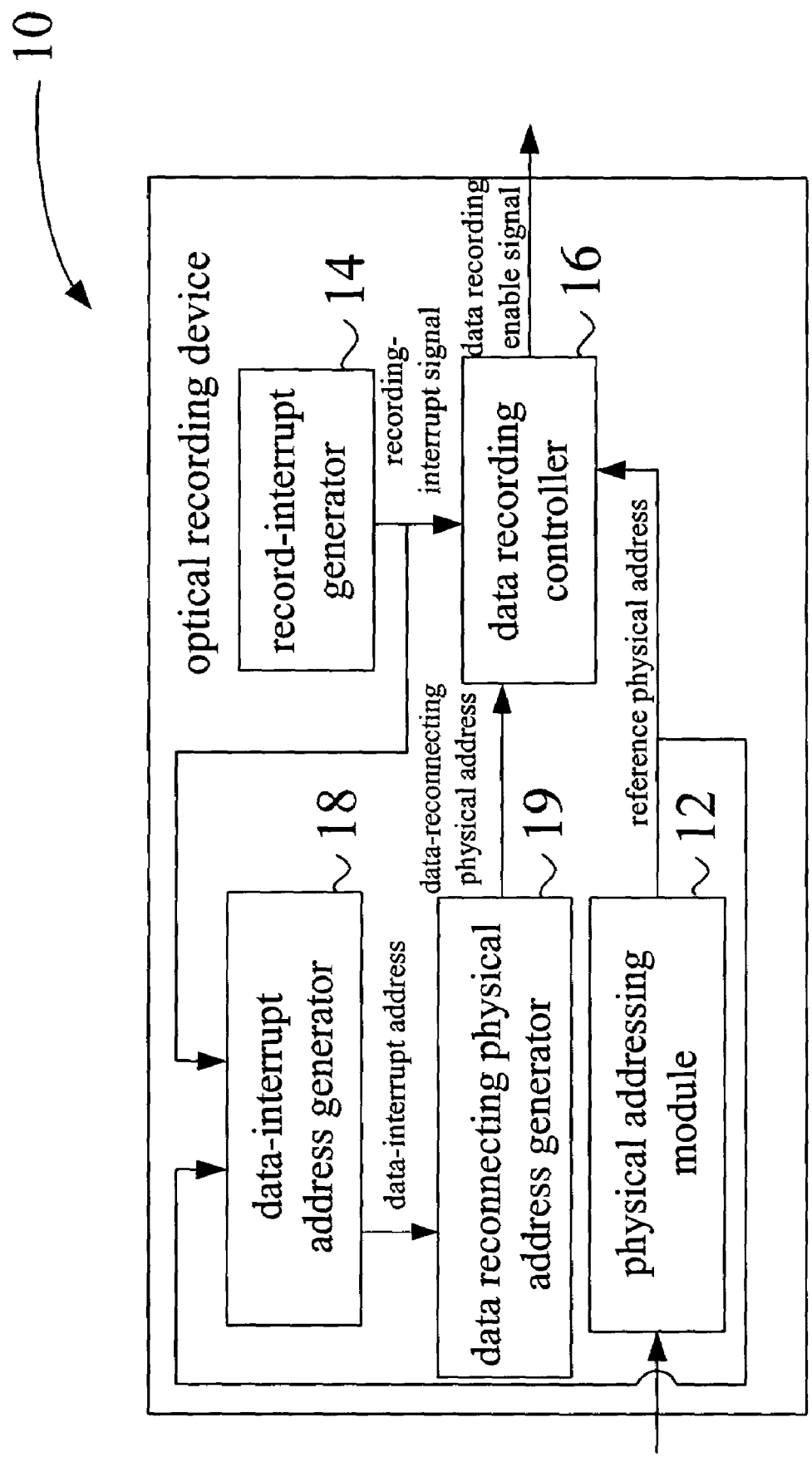
FIG. 2 is a system block diagram of an optical recording device according to the present invention.

Referring to FIG. 2, FIG. 2 is a system block diagram of an optical recording device 10 according to the present invention. The present invention relates to an optical recording device, such as a CD or DVD recorder, for recording a plurality of data onto a corresponding optical storage medium, such as a CD or DVD recordable disc. When recording interrupted, the optical recording device of the present invention generates a data-interrupt address, and then continues to reconnect the interrupted data from a data-reconnecting physical address.

In a preferred embodiment, an optical recording device 10 is for recording data on the optical storage medium 100. The optical recording device 10 comprises a physical addressing module 12, a record-interrupt generator 14, a data recording controller 16, a data-interrupt address generator 18, and a data reconnecting physical address generator 19.

The physical addressing module 12 is used to provide a reference physical address corresponding to a predetermined physical address on the optical storage medium 100, as a reference while recording the data on the optical storage medium 100. The recording-interrupt generator 14 is used to detect a recording-interrupt condition and correspondingly generate a recording-interrupt signal. When the amount of data in the temporary memory is lower than a predetermined threshold value, or some shock error or abnormal condition occurs to the optical recording device 10, for examples, the recording-interrupt generator 14 correspondingly generates a recording-interrupt signal provided to the data recording controller 16 and the data-interrupt address generator 18.

The data recording controller 16 is used to record data onto the optical storage medium 100. When receiving the recording-interrupt signal, the data recording controller 16 suspends recording the data onto the optical storage medium 100. The data-interrupt address generator 18 is used to generate the data-interrupt address to represent the location where data recording is interrupted, and transmit the data-interrupt address to the data reconnecting physical address generator 19. The data reconnecting physical address generator 19 is used to generate a data-reconnecting physical address according to the received data-interrupt address and transmit the data-reconnecting physical address to the data recording controller 16. Therefore, when the optical recording device 10 starts to reconnect the interrupted data, the data recording controller 16 utilizes the data-reconnecting physical address as a starting physical address to record the interrupted data on the optical storage medium. When the reference physical address provided by the physical addressing module 12 is equivalent to the data-reconnecting physical address provided by the data reconnecting physical address generator 19, the data recording controller 16 continues to record the interrupted data onto the optical storage medium 100, and correctly complete data reconnection.

Figure 3:
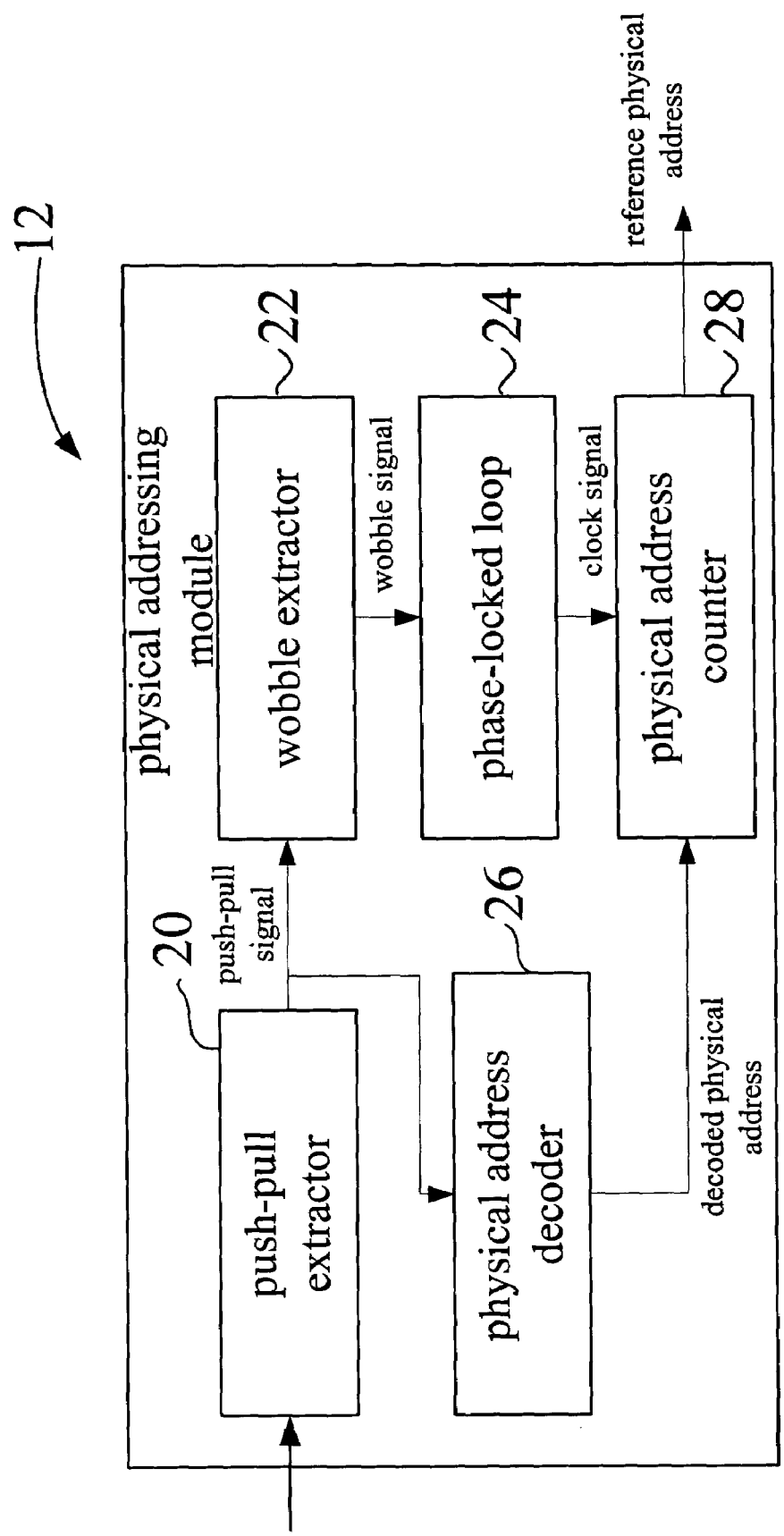
FIG. 3 is a system block diagram of the physical addressing module of the optical recording device shown in FIG. 2.

Referring to FIG. 3, FIG. 3 is a system block diagram of the physical addressing module 12 of the optical recording device 10 shown in FIG. 2. The physical addressing module 12 comprises a push-pull extractor 20, a wobble extractor 22, a phase-locked loop 24, a physical address decoder 26, and a physical address counter 28. When reading the data in the optical storage medium 100, the photo detector of the optical recording device 10 detects the reflected signals from both sides of data track in tangential direction. And the push-pull extractor 20 extracts a push-pull signal by getting the difference of two signals in both sides of the tangential direction. The wobble extractor 22 extracts from the push-pull signal to generate a wobble signal of the pre-groove on the optical storage medium 100, and transmits the wobble signal to the phase-locked loop 24. The phase-locked loop 24 generates a clock signal synchronizing with the wobble signal. The clock signal is transmitted to the physical address counter 28 for counting.

The physical address decoder 26 is used to decode the present push-pull signal to generate correspondingly a decoded physical address pre-grooved on the optical storage medium 100, and then transmit the decoded physical address to the physical address counter 28. The physical address counter 28 receives the decoded physical address from the physical address decoder 26 and the clock signal from the phase-locked loop 24. When the physical address decoder 26 correctly decodes the physical address, the physical address counter 28 is resets to the corresponding decoded physical address, and then performs counting according to the clock signal of the phase-locked loop 24. Therefore the physical address counter 28 can generate a reference physical address that is more precise than the physical address decoded by the physical address decoder 26, and can transmit this more precise reference physical address to the data recording controller 16 as a reference for data recording in the optical storage medium 100. This more precise reference physical address is the reference physical address in the present invention provided by the physical addressing module 12.

Figure 4:
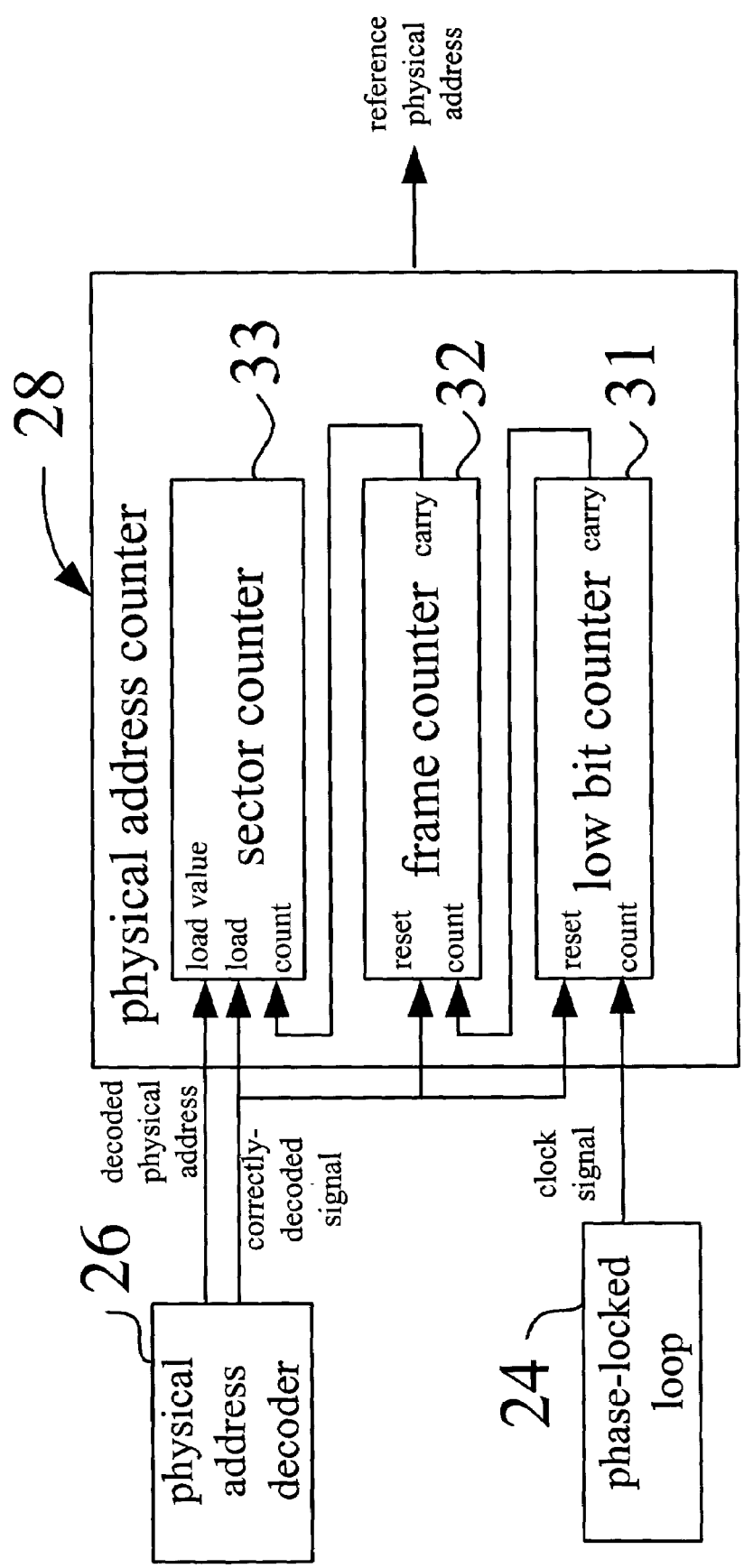
FIG. 4 is a system block diagram of the physical address counter of the physical addressing module shown in FIG. 3.

Referring to FIG. 4, FIG. 4 is a system block diagram of the physical address counter 28 of the physical addressing module 12 shown in FIG. 3. The physical address counter 28 comprises a low-bit counter 31, a frame counter 32, and a sector counter 33. Followings describe the operation of the physical address counter 28 using DVD-R/RW signals (FIG. 1) as examples. When the physical address decoder 26 correctly decodes the physical address, a correctly decoded signal is provided to the low bit counter 31 and the frame counter 32. The low-bit counter 31 and the frame counter 32 are reset to zero for synchronization, and the sector counter 33 loads the physical address that is correctly decoded by the physical address decoder 26. Then, the phase-locked loop 24 generates a clock signal to the low-bit counter 31. The frequency of the clock signal is 186 times of the frequency of the wobble signal (at this moment, the period of the clock signal equals a channel bit unit). The clock signal starts to drive the low-bit counter 31 to count. When counting to a data frame in length (1488 channel bits), the low-bit counter 31 is automatically reset to zero, to drive the frame counter 32 to count. And when counting to a data sector in length (26 data frames), the frame counter 32 is automatically reset to zero, to drive the sector counter 33 to count. Therefore, the low-bit counter 31, the frame counter 32 and the sector counter 33 incorporate to provide a reference physical address corresponding to the physical address of the optical storage medium 100. This reference physical address is input to the data recording controller 16 as a reference for recording data in the optical storage medium 100.

Followings further describe the recording-interrupt generator 14 of the optical recording device 10 shown in FIG. 2. The recording-interrupt generator 14 comprises a memory and a determination unit. The optical recording device 10 reads data from a data source, such as a hard disc, and prepares for recording data onto the optical storage medium 100. Before recorded onto the optical medium 100, the data are temporarily buffered in the memory of the recording-interrupt generator 14. If the amount of the data buffered in the memory is too low, recording interruption occurs to the optical recording device 10 because the amount of the data is not enough. Therefore data recording errors occur. The determination unit of the recording-interrupt generator 14 is used for detecting whether recording interruption occurs. In other words, when the amount of the data temporarily stored in the memory is lower than a predetermined threshold value, a recording-interrupt condition leading to erroneous recording arises. As the recording-interrupt condition arises, the determination unit generates the recording-interrupt signal before the data temporarily stored in the memory decreases to zero. The recording-interrupt signal is provided to the data recording controller 16 to interrupt and stop data recording.

Figure 5:
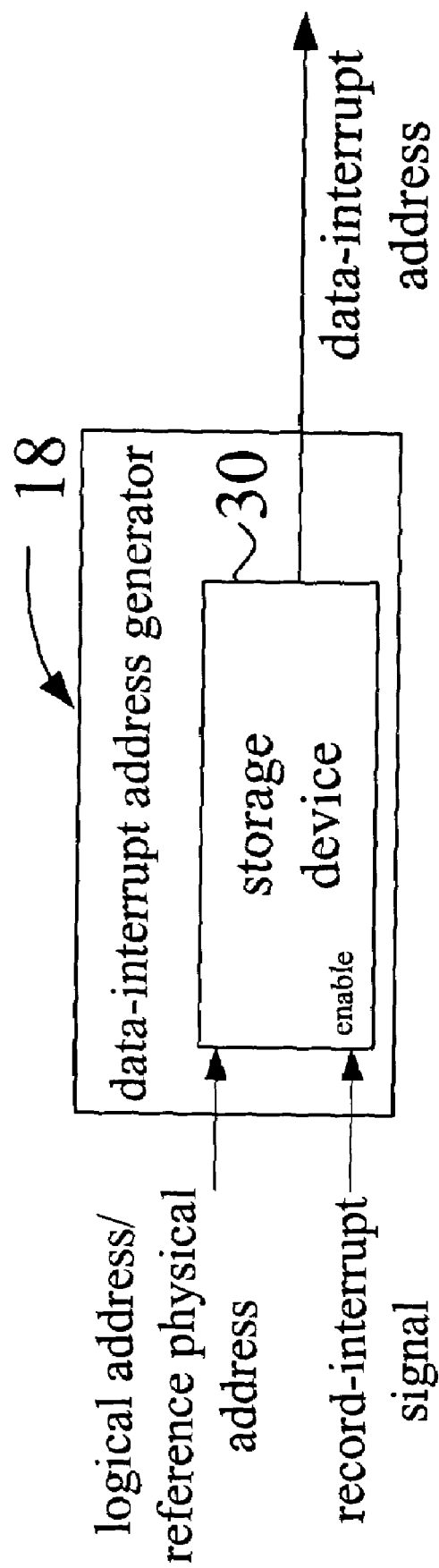
FIG. 5 is a system block diagram of the recording-interrupt generator in the optical recording device shown in FIG. 2.

Referring to FIG. 5, FIG. 5 is a system block diagram of the recording-interrupt generator 18 in the optical recording device 10 shown in FIG. 2. The data-interrupt address generator 18 connects with the recording-interrupt generator 14 and the physical addressing module 12. The data-interrupt address generator 18 comprises a storage device 30. When receiving the record-interrupt signal from the record-intrrupted generator 14, the data-interrupt address generator 18 stores an address in the storage device 30 and generates a data-interrupted address which can be corresponding to the location where data recording is interrupted. The data-interrupted address is then transmitted to the data-reconnecting physical address generator 19. In other words, the address stored in the storage device 30 is either the reference physical address provided by the physical addressing module 12 or the logical address corresponding to the recorded data.

Followings further describe the data-reconnecting physical address generator 19 of the optical recording device 10 shown in FIG. 2. When receiving the data-interrupt address from the data-interrupt address generator 18, the data-reconnecting physical address generator 19 uses this data-interrupted address to generate a data-reconnecting physical address for the data-recording controller 16. A commonly used method is to add or subtract a displacement value to/from the data-interrupted address to form the data-reconnecting physical address. This method can be implemented by either a micro-processor or a specified hardware. The data-recording controller 16 then can use the data-reconnecting physical address as a start physical address to reconnect the interrupt data to continue recording data onto the optical storage medium 100. In general, the displacement value is determined to compensate system delay of the optical recording device 10. There are many possible components of system delay. For example, when the laser pickup head of the optical recording device 10 reads the optical storage medium 100, delay occurs between the time when emitting laser beam and the time when reading the reflected signal. Besides, the delay time is different in different situations. The data-reconnecting physical address generator 19 can adjust the displacement value based on the delay time, so as to make the data-reconnecting physical address to be a correct start physical address, and consequently to enable the data recording controller 16 reconnect and record data correctly while reconnecting the interrupted data.

Figure 6:
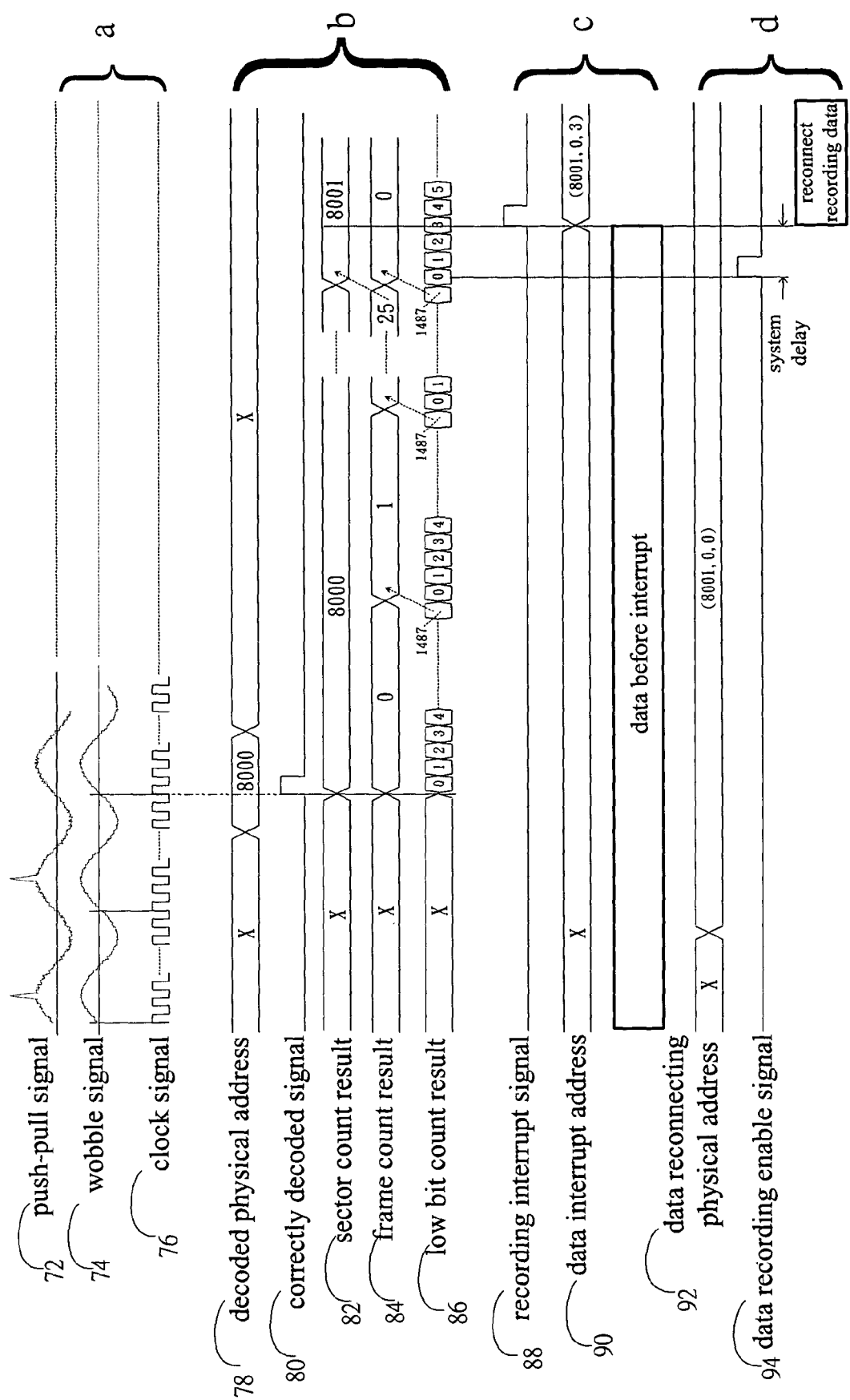
FIG. 6 shows timing diagrams for signals and addresses described in the embodiments shown in FIGS. 2 to 5.

Referring to FIG. 6, FIG. 6 shows timing diagrams for signals and addresses described in the embodiments shown in FIGS. 2 to 5. The timing diagrams in FIG. 6 are grouped into four groups a, b, c and d for better explanations. Please refer to FIG. 3 and the three timing diagrams of group a in FIG. 6 those represent a push-pull signal 72, a wobble signal 74 and a clock signal 76, respectively. The push-pull extractor 20 extracts a push-pull signal 72, and the wobble extractor 22 extracts a wobble signal 74 from the push-pull signal 72. The phase-locked loop 24 generates a clock signal 76 whose frequency is 186 times the wobble signal 74, and further transmits the clock signal 76 to the physical address counter 28 for counting.

The five timing diagrams of group b in FIG. 6 represent a decoded physical address 78, a correctly decoded signal 80, a sector count result 82, a frame count result 84 and a low-bit count result 86, respectively. Also referring to the physical address counter 28 shown in FIG. 4, the physical address decoder 26 detects the pre-groove of the push-pull signal 72 to decode the physical address. For example, a physical address "8000" is correctly decoded and obtained. When the correct physical address "8000" is obtained, this physical address "8000" is loaded to the sector counter 33, and the correctly decoded signal 80 is transmitted to the low-bit counter 31 and the frame counter 32 to reset the low-bit counter 31 and the frame counter 32 to zero. Then, the low-bit counter 31 is driven by the clock signal 76 provided by the phase-locked loop 24 to count. When counting to 1488 channel bits, the low-bit counter 31 is automatically reset to zero and drives the frame counter 32 to count. When counting to 26 data frames, the frame counter 32 is automatically reset to zero and drives the sector counter 33 to count "8001".

Referring to timing diagrams of group c in FIG. 6 and FIGS. 2 and 5, a recording-interrupt signal 88 is generated by the record-interrupt generator 14 in the recording-interrupt condition. The data-interrupt address generator 18 and the data recording controller 16 both receive the recording-interrupt signal 88. In the embodiment, the data-interrupt address generator 18 stores the reference physical address (8001, 0, 3) transmitted from the physical address counter 28 of the physical addressing module 12. The value (8001, 0, 3) is recorded in the storage device 30 of the data-interrupt address generator 18. The value (8001, 0, 3) represents that the data is interrupted at the 3rd channel bit in the 0th data frame in the 8001st sector, and the data-interrupt address 90 is (8001, 0, 3) accordingly. This data-interrupt address 90 is provided to the data-reconnecting physical address generator 19.

Refer to timing diagrams of group d in FIG. 6. The data-reconnecting physical address generator 19 processes the data-interrupt address 90 in order to generate the data-reconnect physical address 92. For example, if the system delay for the laser pickup head to read the optical storage medium 100 is equivalent to 3 channel bits, the data-reconnecting physical address generator 19 will subtract this system delay from (8001, 0, 3) which is the reference physical address recorded in the storage device 30. In other words, the data reconnecting physical address generator 19 generates the data reconnecting physical address as the followings:

(the 8001st sector, the 0th data frame, the 3rd channel bit)–3 channel bits=(the 8001st sector, the 0th data frame, the 0th channel bit)

As a result, in order to reconnecting the interrupted data, the data recording controller 16 will send a data recording enable signal 94 to the laser pickup head to write data. Because of the system delay for write power to be delivered for the laser pickup head is equivalent to 3 channel bits. So the laser pickup head actually reconnects the data from (8001, 0, 3). As a result, the system delay is compensated, and the data recorded afterwards can reconnect to the last data.

Figure 7A:
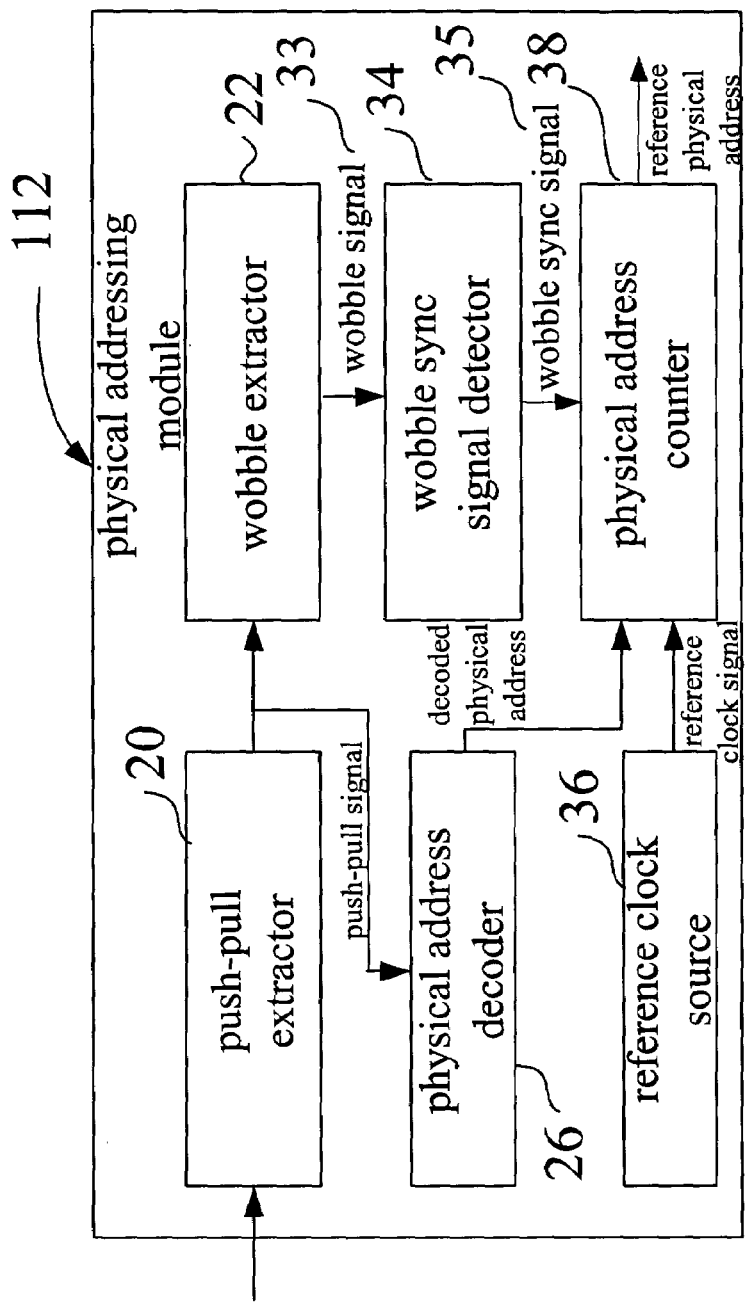
FIG. 7A is a system block diagram of another embodiment of the physical addressing module in the optical recording device according to the present invention.
Figure 7B:
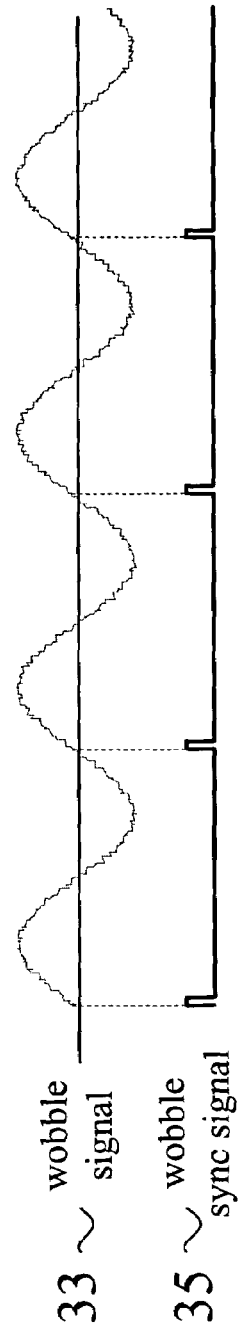
FIG. 7B shows the wobble signal and wobble sync signal of the physical addressing module shown in FIG. 7A.

Referring to FIGS. 7A and 7B, FIG. 7A is a system block diagram of another embodiment of the physical addressing module 112 in the optical recording device according to the present invention. FIG. 7B shows the wobble signal 33 and wobble sync signal 34 of the physical addressing module 112 shown in FIG. 7A. The physical addressing module 112 shown in FIG. 7A and the physical addressing module 12 shown in FIG. 3 are similar. The physical addressing module 112 comprises a push-pull extractor 20, a wobble extractor 22, a wobble sync signal detector 34, a physical address decoder 26, a reference clock source 36 and a physical address counter 38. The push-pull extractor 20, the wobble extractor 22, and the physical address decoder 26 in the physical addressing module 112 are the same as the ones in the physical addressing module 12, respectively. The major difference between the physical addressing module 112 and 12 is the wobble sync signal detector 34 and the reference clock source 36 used in the physical addressing module 112. Also, the counting method of the physical address counter 38 is different from that of the physical address counter 28.

In FIG. 7A, the wobble sync signal detector 34 is used to detect the wobble signal 33 of the wobble extractor 22 and generate a wobble sync signal 35 synchronizing with the wobble signal. The reference clock source 36 provides a reference clock signal. The frequency of the reference clock signal is higher than that of the wobble signal. An embodiment of the wobble sync signal detector 34 is a phase-locked loop, for locking the wobble signal and adjusting the phase of an output signal based on one period of a high frequency clock signal as an adjusting unit. This high frequency clock signal can be the reference clock signal from the reference clock source 36, or a high frequency clock signal from other signal source, to allow the wobble sync signal detector 34 to generate the wobble sync signal.

In FIG. 7A, the physical address counter 38 comprises a plurality of counters, which can be divided into low-bit and high-bit parts. The low bit part uses the high reference clock signal mentioned in the above to count. When the physical address decoder 26 correctly decodes the physical address, the physical address counter 38 is reset to the corresponding decoded physical address. Then the physical address counter 38 resets the low bit part of the physical address counter 38 according to the received wobble sync signal. So the high-bit part of the physical address counter 38 begins to count to generate a more precise reference physical address.

Figure 8:
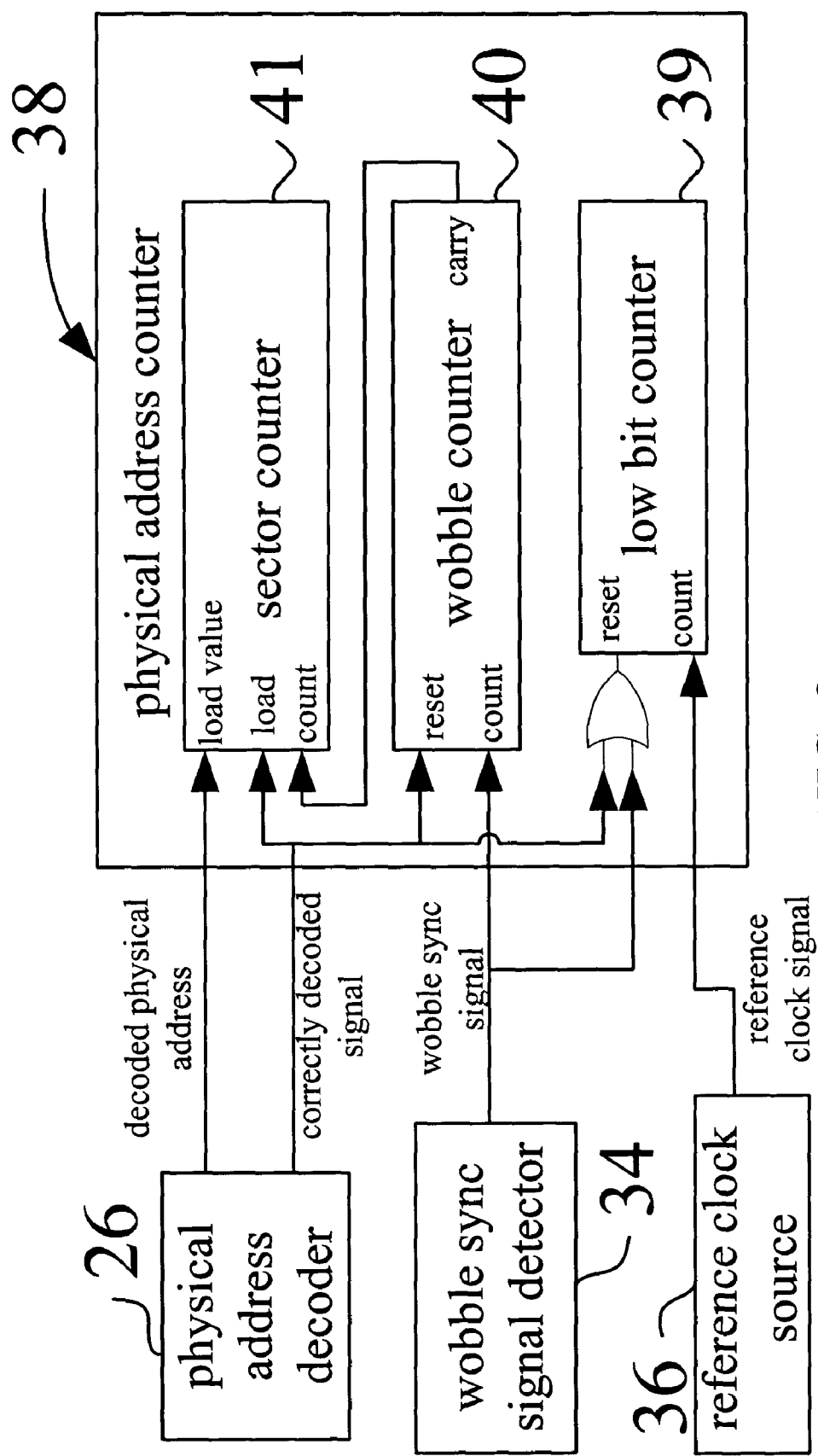
FIG. 8 is a system block diagram of the physical address counter of the physical addressing module shown in FIG. 7A.

Referring to FIG. 8, FIG. 8 is a system block diagram of the physical address counter 38 of the physical addressing module 112 shown in FIG. 7A. In an embodiment, the physical address counter 38 comprises a low-bit counter 39, a wobble counter 40 and a sector counter 41. The low-bit counter 39 counts based on the reference clock signal from reference clock source 36. When the physical address decoder 26 correctly decodes the physical address, it send the correctly-decoded signal to the low bit counter 39 and the wobble counter 40 to reset both to zero. The sector counter 41 loads the correct physical address decoded by the physical address decoder 26. The wobble sync signal generated by the wobble sync signal detector 34 is also used to reset the low bit counter 39 and drive the wobble counter 40 to count. When the wobble counter 40 counts to a data sector length (e.g. in DVD-RW format, 1 data sector has 26 data frames for total 208 wobble period, equivalent to 38688 channel bits), the wobble counter 40 is automatically reset to zero, and drives the sector counter 41 to count. Therefore, the low bit counter 39, the wobble counter 40 and the sector counter 41 incorporate to provide a reference physical address corresponding to the DVD physical address. This reference physical address can be input to the data recording controller 16 for reference for data recording in the optical storage medium 100.

Figure 9A:
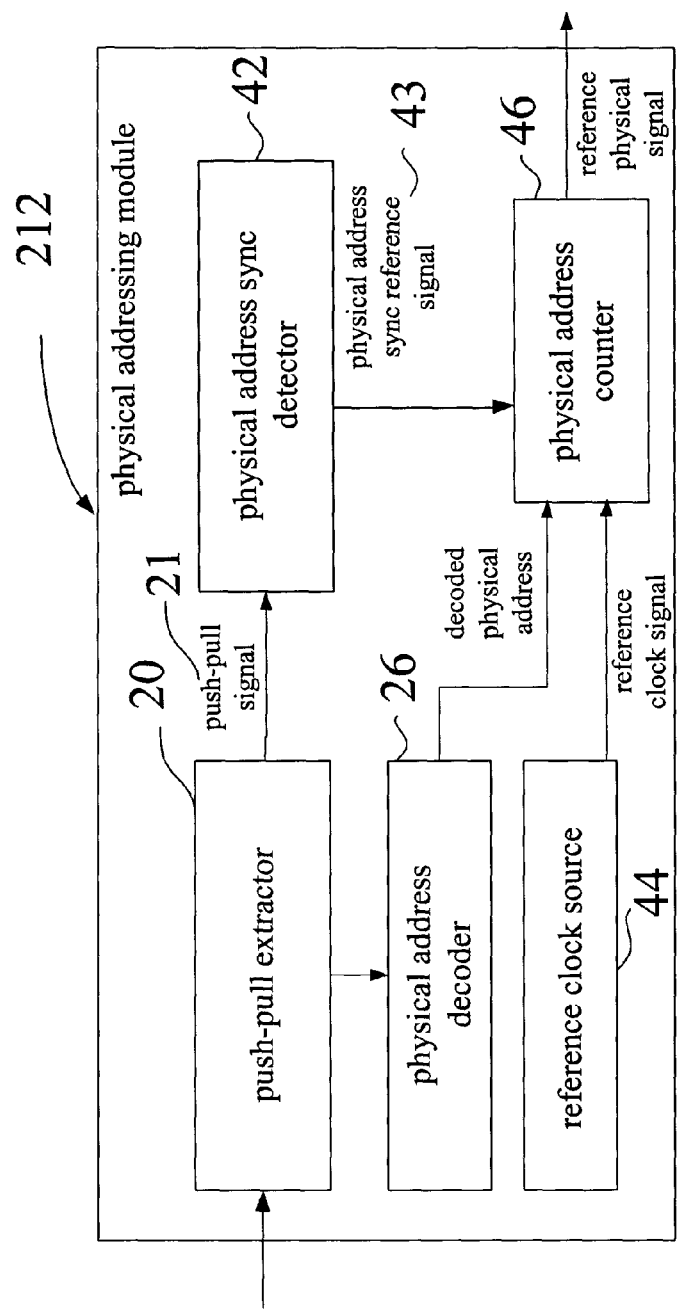
FIG. 9A is a system block diagram of another embodiment of the physical addressing module in the optical recording device according to the present invention.
Figure 9B:
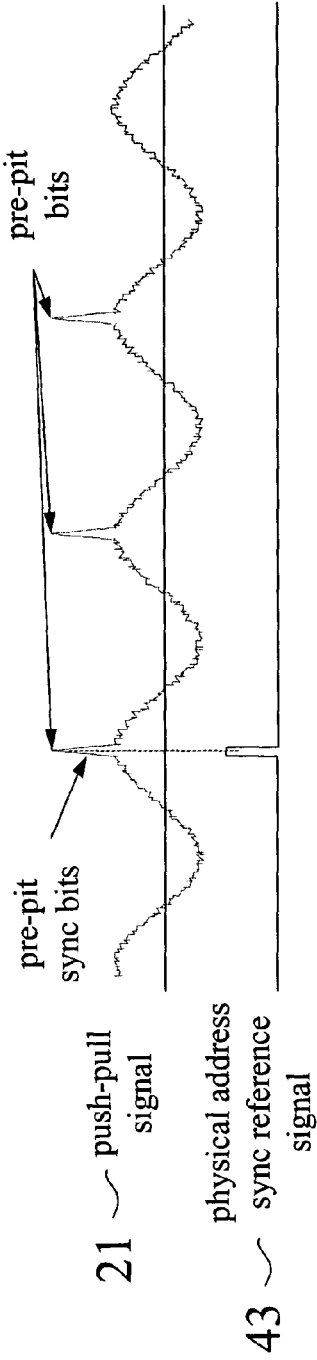
FIG. 9B shows the push-pull signal and the physical address sync reference signal of the physical addressing module shown in FIG. 9A.

Referring to FIGS. 9A and 9B, FIG. 9A is a system block diagram of another embodiment of the physical addressing module 212 in the optical recording device according to the present invention. FIG. 9B shows the push-pull signal 21 and the physical address sync reference signal 43 of the physical addressing module 212 shown in FIG. 9A. The physical addressing module 212 shown in FIG. 9A and the physical addressing module 112 shown in FIG. 7A are similar in some elements. The physical addressing module 212 comprises a push-pull extractor 20, a physical address decoder 26, a physical address sync detector 42, a reference clock source 44, and a physical address counter 46. As described before, the optical storage medium 100 has some pre-pit bits in between the adjacent pre-grooves for storing the physical block address of the pre-groove. Therefore, the corresponding physical address information on the optical storage medium 100 can be obtained from the push-pull signal 21. From the push-pull signal 21, the physical address sync detector 42 can detect a physical address sync signal pre-grooved on the optical storage medium 100, and generate a physical address sync reference signal. For DVD-RW, for example, the physical address sync signal on the optical storage medium can be position of the pre-pit sync bit.

The reference clock source 44 provides a reference clock signal, whose frequency is higher than the frequency of the wobble signal. The physical address counter 46 also comprises a plurality of counters. Those counters can be divided into two parts, the low bit and high bit parts. The low bit part counts based on the high reference clock signal with higher frequency. When the physical address decoder 26 correctly decodes the physical address, the physical address counter 46 is reset to the corresponding address. Then, according to the received physical address sync reference signal, the low bit part of the physical address counter 46 is reset, and the high bit part starts counting. In this way, the more precise reference physical address can be generated.

In an embodiment, the physical address sync detector 42 can be a phase-locked loop, for locking the physical address sync signal and adjusting the phase of an output signal based on one period of a high frequency clock signal as an adjusting unit. And this high frequency clock signal can be the reference clock signal of the reference clock source 44, or a high frequency clock signal from other signal source, to allow the physical address sync detector 42 to generate the physical address sync reference signal.

Figure 10:
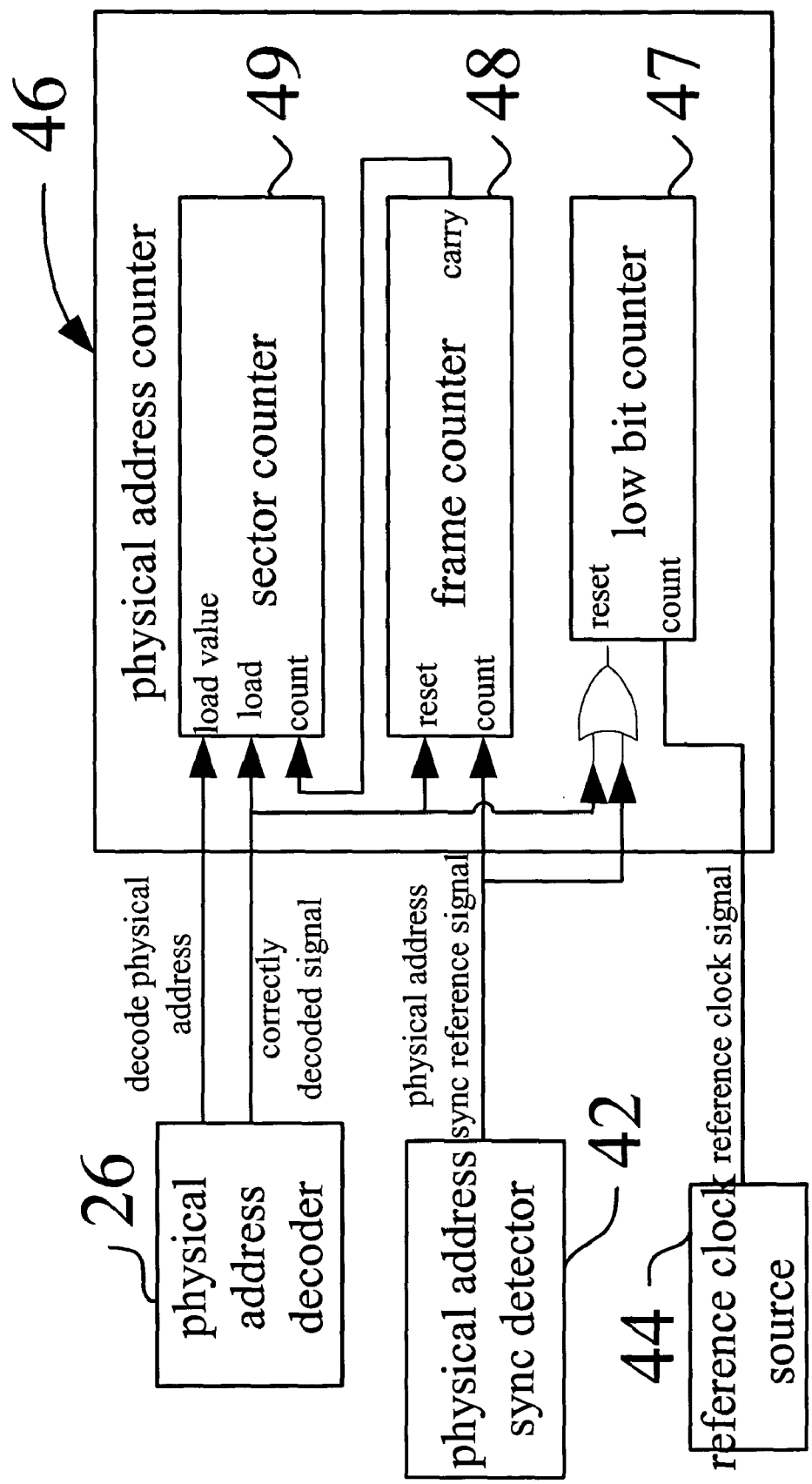
FIG. 10 is a system block diagram of the physical address counter in the physical addressing module shown in FIG. 9A

Referring to FIG. 10, FIG. 10 is a system block diagram of the physical address counter 46 in the physical addressing module 212 shown in FIG. 9A. In an embodiment, the physical address counter 46 comprises a low bit counter 47, a frame counter 48 and a sector counter 49. The low bit counter 47 counts according to the reference clock signal of reference clock source 44. After the physical address decoder 26 correctly decodes the physical address, the correctly decoded signal is sent to the low bit counter 47 and the frame counter 48. The low bit counter 47 and the frame counter 48 are reset to zero. The sector counter 49 loads the correct physical address decoded by the physical address decoder 26. The physical address sync reference signal generated by the physical address sync detector 42 also resets the low bit counter 47 and makes the frame counter 48 to count. When the frame counter 48 counts to a data sector length (e.g. in DVD-RW format, 1 data sector has 26 data frames wherein 13 even number data frames have total 13 pre-pit sync bits), the frame counter 48 is automatically reset to zero, and drives the sector counter 49 to count. For the data frames without pre-pit sync bits (odd number data frames), use the previously detected positions of the pre-pit sync bits to predict and obtain an inserted pre-pit sync bit signal. Therefore, the low bit counter 47, the frame counter 48 and the sector counter 49 incorporate to provide a reference physical address corresponding to the DVD physical address. This reference physical address can be input to the data recording controller 16 for the reference for data recording in the optical storage medium 100.

Figure 11A:
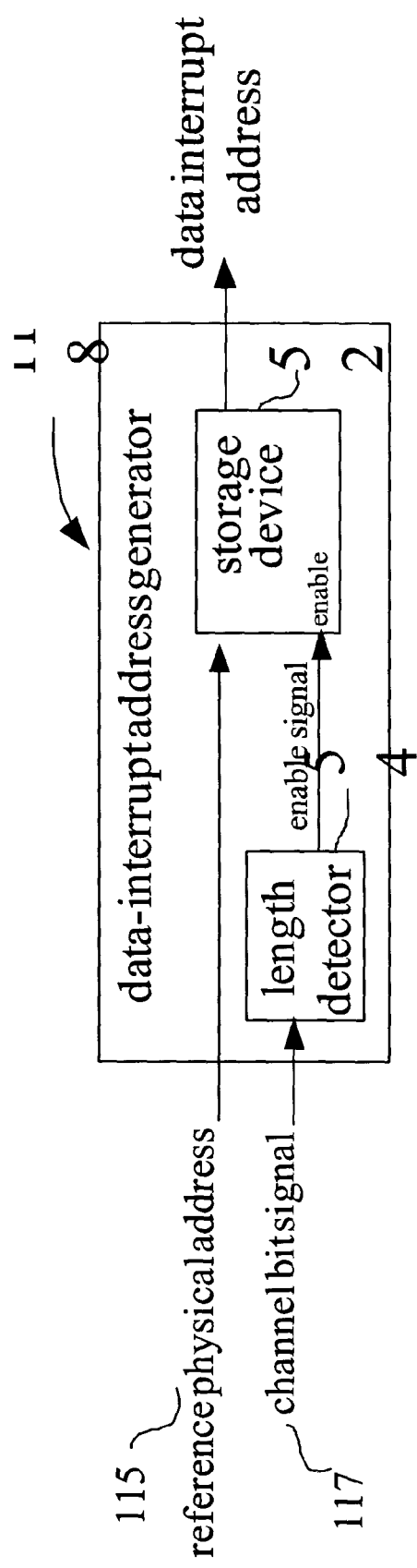
FIG. 11A is a system block diagram of another embodiment of the data-interrupt address generator in the optical recording device according to the present invention.
Figure 11B:
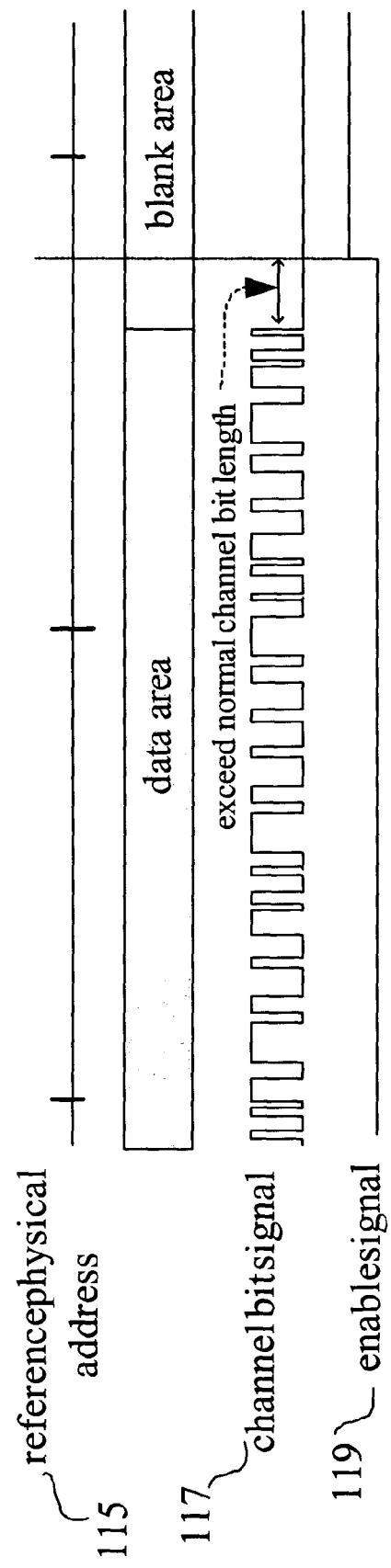
FIG. 11B shows the reference physical address, the channel bit signal and the enable signal shown in FIG. 11A.

Referring to FIGS. 11A and 11B, FIG. 11A is a system block diagram of another embodiment of the data-interrupt address generator 118 in the optical recording device according to the present invention. FIG. 11B shows the reference physical address 115, the channel bit signal 117 and the enable signal 119 shown in FIG. 11A. In an embodiment, the data-interrupt address generator 118 comprises a storage device 52 and a length detector 54. The length detector 54 is for receiving a channel bit signal from the optical storage medium 100 and detecting if the length of continuously identical signal status exceeds a maximum allowable value.

As mentioned before, except the data frame sync (which comprises 14 continuous bits in the same signal status), the EFM+ of the optical recording device 10 allows the continuous extend of the same signal status in a channel bit to be no more than 11 bits and no less than 3 bits. In an example, the maximum value in normal channel bit is 14 bits. When detect that the length of continuously identical signal status exceeds the normal channel bit length or the maximum allowable value, e.g. 14 bits, it is possible that this place is where data recording is interrupted (also the boundary between the data area where recorded with data and the blank area on the optical storage medium 100). At this moment, the length detector 54 generates an enable signal 119 to the storage device 52. When receiving the enable signal generated by the length detector 54, the storage device 52 either records the reference physical address provided by the physical addressing module 12, or records the logical address corresponding to recorded data reading from the optical storage medium 100, to generate a data-interrupt address representing where data is interrupted. The data-interrupt address is then sent to the data reconnecting physical address generator 19.

Figure 12:
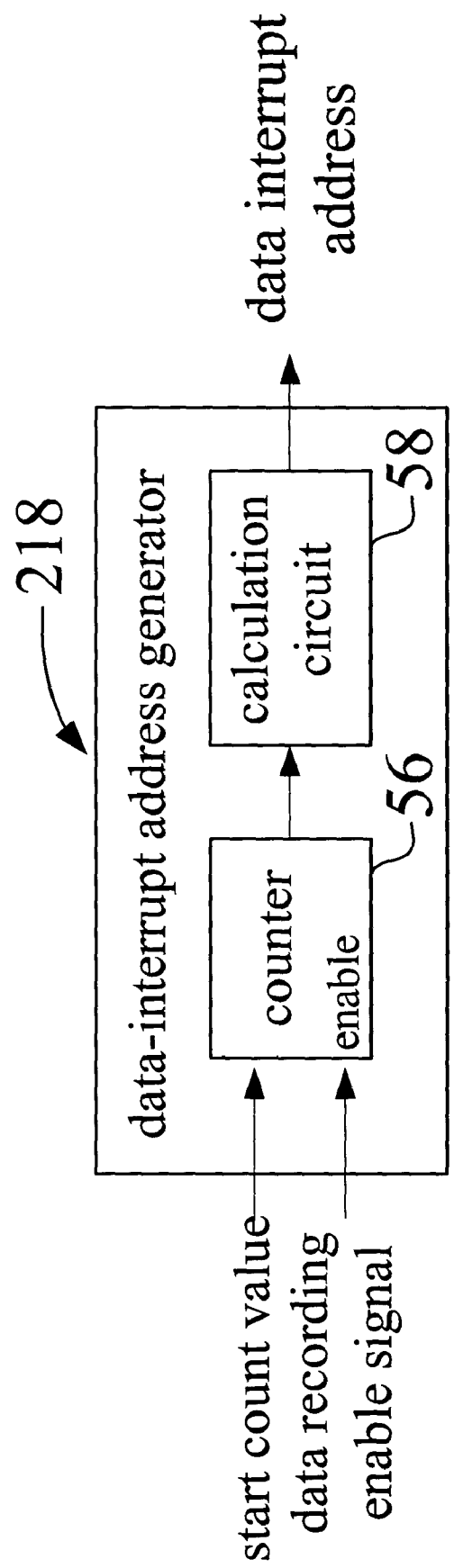
FIG. 12 is a system block diagram of another embodiment of the data-interrupt address generator in the optical recording device according to the present invention.

Referring to FIG. 12, FIG. 12 is a system block diagram of another embodiment of the data-interrupt address generator 218 in the optical recording device according to the present invention. In another embodiment, the data-interrupt address generator 218 comprises a counter 56 and a calculation circuit 58. When the data are prepared to be recorded onto the optical storage medium 100 with the data recording controller 16, the counter 56 is set to a starting counting value. The starting counting value can be a given number (e.g. 0), a starting logical address of the predetermined data to be recorded, or a starting physical address of the predetermined data to be recorded. Then, when the data recording controller 16 starts recording data onto the optical storage medium 100, it also generates a high-level data record enable signal to the counter 56, to enable the counter 56 start counting and generate a corresponding incremental value. When abnormal operation occurs to stop data recording, the data record enable signal becomes low level, to stop the counter 56 from counting. At this moment, the calculation circuit 58 takes over, using the starting counting value set in the counter 56 plus the incremental value generated later on, to calculate the data-interrupt address. For example, the starting counting value of the counter 56 is set as zero. Consequently, when stop recording, the incremental value counted by the counter 56 is actually equivalent to the length of the data that have been recorded in the optical storage medium 100. The calculation circuit 58 will use the incremental value of the counter 56 plus the initial physical address to generate a stop physical address where recording stops. In another example, the starting counting value of the counter 56 is set as the initial physical address where recording starts. The counter 56 will add up value based on this starting counting value during recording. When stop recording, the count value of the counter 56 is equivalent to the stop physical address where recording stops. That is where data is interrupted. In this case, the calculation circuit 58 can use the result of the counter 56 and directly output the result to the data reconnecting physical address generator 19.

When receiving the data-interrupt address, the data reconnecting physical address generator 19 generates a corresponding data reconnect physical address and transmits it to the data recording controller 16. If the data-interrupt address generated by the data-interrupt address generator 18, 118, 218 is a reference physical address, the system delay of the optical recording device 10 will be considered and compensated when adding/subtracting displacement value to/from the data-interrupt address by the data reconnecting physical address generator 19. An example of the system delay is the time delay for the leaser pickup head in reading/recording the optical storage medium. If the data-interrupt address generated by the data-interrupt address generator 18 is a logical address corresponding to the recorded data on the optical storage medium 100, not only the system delay but also a difference between the logical address corresponding to the recorded data on the optical storage medium 100 and the physical address will be considered and compensated when adding/subtracting displacement value to/from the data-interrupt address. The difference between the logical address corresponding to the recorded data on the optical storage medium 100 and the physical address can detect by the following method. When reading the optical storage medium 100, read the physical address of the push-pull signal and the logical address of the channel bit signal, and subtract each other to obtain the difference between the logical address corresponding to the recorded data on the optical storage medium 100 and the physical address.

Figure 13:
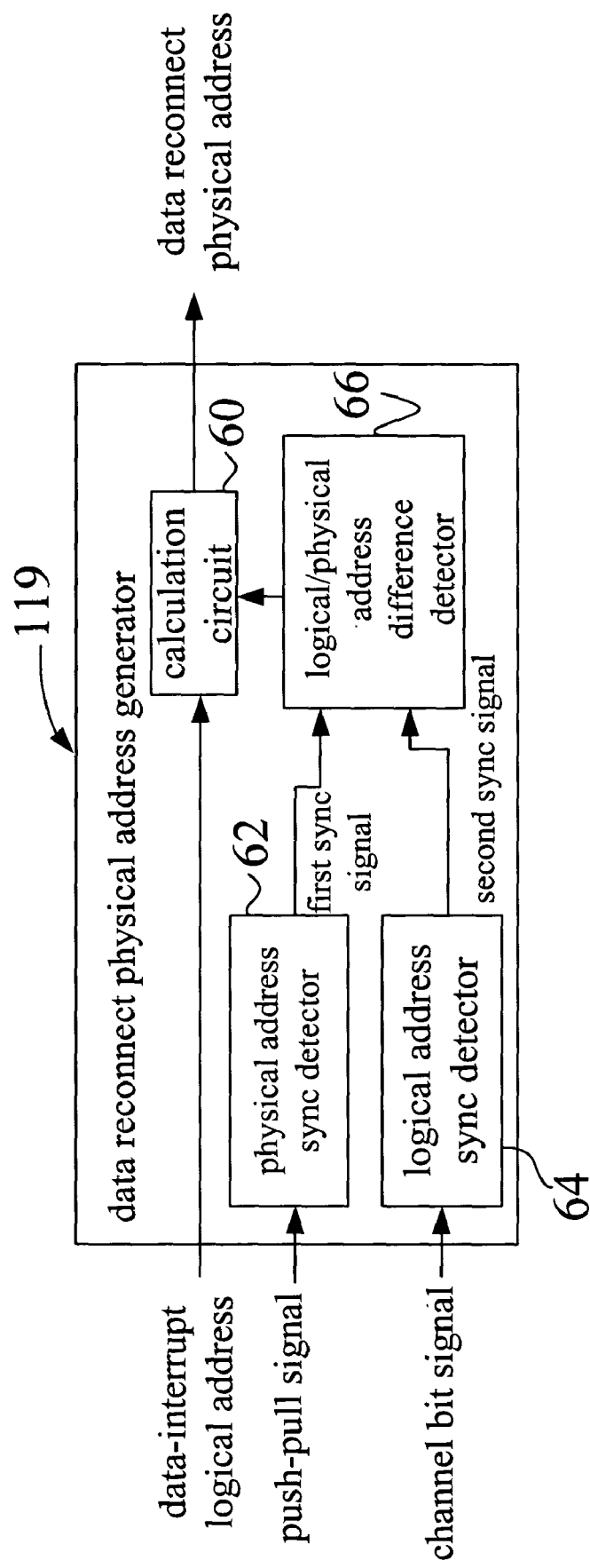
FIG. 13 is a system block diagram of the data-reconnecting physical address generator in the optical recording device according to the present invention.

Referring to FIG. 13, FIG. 13 is a system block diagram of the data-reconnecting physical address generator 119 in the optical recording device according to the present invention. The data reconnect physical address generator 119 is preferably used when the data-interrupt address generated by the data-interrupt address generator 18 is a logical address. In the embodiment, the data reconnect physical address generator 119 comprises a calculation circuit 60, a physical address sync detector 62, a logical address sync detector 64, and a logical/physical address difference detector 66. From the push-pull signal, the physical address sync detector 62 detects a physical address sync signal pre-grooved on the optical storage medium 100, and generates a first sync signal synchronizing with the physical address. The logical address sync detector 64 detects the logical address sync signal of the recorded data on the optical storage medium 100, and generates a second sync signal synchronizing with the logical address. For example, for DVD-RW, the first sync signal can be a sync signal synchronizing with the position of the pre-pit sync bit of the push-pull signal, and the second sync signal can be a sync signal synchronizing with the position of the data frame sync of the channel bit signal. The logical/physical address difference detector 66 detects the time lag between the first sync signal and the second sync signal, and calculates the difference between the logical address and the physical address. The calculation circuit 60 calculates the data-interrupt logical address provided by the data-interrupt address generator 18 and the calculated difference provided by the logical/physical address difference detector 66. The calculation circuit 60 generates a data reconnect physical address to the data recording controller 16. Accordingly, the data recording controller 16 can utilize the data reconnect physical address as a reference point to reconnect the interrupted data and continue recording onto the optical storage medium 100.

In conclusion, the advantages of the optical recording device according to the present invention include the followings:

First, the reference physical address provided by the physical addressing module 12 is very precise. Therefore, the place where data to be reconnected can be precisely controlled. With adjustment of the physical address for data reconnection, related system delay can be compensated and errors of data reconnection can be reduced.

Second, when finding place for data reconnection, the present invention refers to the physical address pre-grooved on the optical storage medium, rather than the logical address recorded on the optical storage medium. Even though the data is not correctly recorded onto the disc (e.g. because of error in the pickup head positon), the optical recording device according to the present invention can still correctly reconnect following data.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical recording device for recording a plurality of data on an optical storage medium, generating a data-interrupt logical address when recording interrupted, and then continuing to reconnect interrupted data from a data-reconnecting physical address so as to enable further correct reading of said interrupted data, said optical recording device comprising:

a physical addressing module for providing a reference physical address corresponding to a predetermined physical address on said optical storage medium, as a reference while recording said data on said optical storage medium;

a recording-interrupt generator for detecting a recording-interrupt condition, and correspondingly generating a recording-interrupt signal;

a data recording controller for recording said data on said optical storage medium, and suspending recording said data on said optical storage medium when receiving said recording-interrupt signal;

a data-interrupt logical address generator for generating said data-interrupt logical address when recording interrupted; and a data-reconnecting physical address generator for generating said data-reconnecting physical address according to said data-interrupt logical address, so as to enable the data recording controller, while starting to reconnect said interrupted data, to utilize said data-reconnecting physical address as a starting physical address to record said interrupted data on said optical storage medium, wherein said physical addressing module comprises:

a physical address decoder for decoding a physical address detected from said optical storage medium, and generating correspondingly a decoded physical address of said optical storage medium; and a physical address counter, when the physical address is correctly decoded, said physical address counter being set according to said corresponding decoded physical address, then performing counting according to a clock signal, and generating said reference physical address.

2. The optical recording device of claim 1, wherein said optical recording device comprises a laser diode for emitting a laser beam to said optical storage medium, and a photo detector for reading a reflected signal from said optical storage medium.

3. The optical recording device of claim 2, wherein said physical addressing module further comprises:

a push-pull extractor for extracting a push-pull signal by subtracting two signals in both sides of a tangential direction, along which said photo detector reads the reflected signal from said optical storage medium;

a wobble extractor for extracting a wobble signal in a predetermined groove on said optical storage medium from said push-pull signal; and a phase-locked loop for locking said wobble signal and generating a clock signal synchronizing with said wobble signal.

4. The optical recording device of claim 2, wherein said physical addressing module further comprises:

a push-pull extractor for extracting a push-pull signal by subtracting two signals in both sides of a tangential direction, along which said photo detector reads the reflected signal from said optical storage medium;

a wobble extractor for extracting a wobble signal in a predetermined groove on said optical storage medium from said push-pull signal;

a reference clock source for providing a reference clock signal, said reference clock signal having a higher frequency than said wobble signal does; and a wobble sync signal detector for locking said wobble signal and generating a wobble sync signal synchronizing with said wobble signal;

wherein the physical address counter comprises at least a low-bit counter and a high-bit counter, said low-bit counter performing counting according to said reference clock signal, wherein when said physical address is correctly decoded, said physical address counter is reset to said corresponding decoded physical address, and enables reset and carry of said low-bit counter according to said wobble sync signal, so that the high-bit counter begins counting to generate said reference physical address which is more precise than said decoded physical address.

5. The optical recording device of claim 4, wherein said wobble sync signal detector is a phase-locked loop for locking said wobble signal and adjusting the phase of an output signal based on one period of said reference clock signal as an adjusting unit, to generate said wobble sync signal.

6. The optical recording device of claim 1, wherein said data-interrupt address generator comprises a storage device, and while recording interrupted, an address corresponding to the interrupted place of said data is recoded in the storage device as said data-interrupt logical address.

7. The optical recording device of claim 1, wherein said data-reconnecting physical address generator generates said data-reconnecting physical address by adding or subtracting a displacement value to said data-interrupt logical address.

8. The optical recording device of claim 7, wherein the displacement value generated by said data-reconnecting physical address generator comprises a difference between the logical address corresponding to the recorded data on said optical storage medium and the physical address of said interrupted data.

9. The optical recording device of claim 8, wherein said data-reconnecting physical address generator comprises:

a physical address sync detector for detecting a physical address sync signal pre-grooved on said optical storage medium from a push-pull signal, and generating a first sync signal synchronizing with the physical address of said optical storage medium;

a logical address sync detector for detecting a logical address sync signal of the recorded data on said optical storage medium, and generating a second sync signal synchronizing with the logical address of said optical storage medium; and a logical/physical address difference detector for detecting time lag between said first sync signal and said second sync signal, and calculating the difference between the logical address and the physical address.

10. The optical recording device of claim 1, wherein said recording-interrupt condition is the condition leading to erroneous record of said storage device, and said recording-interrupt generator comprises a determination unit for detecting said recording-interrupt condition and generating said recording-interrupt signal.

11. The optical recording device of claim 10, wherein said data that are read from a data source and have not yet been recorded on said optical storage medium are temporarily stored in a memory of said recording-interrupt generator, and wherein said recording-interrupt condition arises when the amount of data temporarily stored in said memory is lower than a predetermined threshold value, and said determination unit generates said recording-interrupt signal before the data temporarily stored in said memory decrease to none.

12. An optical recording device for recording a plurality of data on an optical storage medium, generating a data-interrupt address when recording interrupted, and then continuing to reconnect interrupted data from a data-reconnecting physical address so as to enable further correct reading of said interrupted data, said optical recording device comprising:

a physical addressing module comprising:

a physical address decoder for decoding a physical address pre-grooved on said optical storage medium from a push-pull signal and generating correspondingly a decoded physical address of said optical storage medium; and a physical address counter being reset to said corresponding decoded physical address when the physical address is correctly decoded and performing counting according to a clock signal and generating a reference physical address as a reference while recording said data on said optical storage medium;

a recording-interrupt generator for detecting a recording-interrupt condition, and correspondingly generating a recording-interrupt signal;

a data recording controller for recording said data on said optical storage medium, and suspending recording said data on said optical storage medium when receiving said recording-interrupt signal;

a data-interrupt address generator for generating said data-interrupt address when recording interrupted; and a data-reconnecting physical address generator for generating said data-reconnecting physical address according to said data-interrupt address, so as to enable the data recording controller, while starting to reconnect said interrupted data, to utilize said data-reconnecting physical address as a starting physical address to record said interrupted data on said optical storage medium.

13. The optical recording device of claim 12, wherein said optical recording device comprises a laser diode for emitting a laser beam to said optical storage medium, and a photo detector for reading a reflected signal from said optical storage medium.

14. The optical recording device of claim 13, wherein said physical addressing module further comprises:

a push-pull extractor for extracting said push-pull signal by subtracting two signals in both sides of a tangential direction, along which said photo detector reads the reflected signal from said optical storage medium;

a wobble extractor for extracting a wobble signal in a predetermined groove on said optical storage medium from said push-pull signal; and a phase-locked loop for locking said wobble signal and generating said clock signal synchronizing with said wobble signal.

15. The optical recording device of claim 13, wherein said physical addressing module further comprises:
a push-pull extractor for extracting a push-pull signal by subtracting two signals in both sides of a tangential direction, along which said photo detector reads the reflected signal from said optical storage medium;
a wobble extractor for extracting a wobble signal in a predetermined groove on said optical storage medium from said push-pull signal;
a reference clock source for providing said clock signal, said clock signal having a higher frequency than said wobble signal does; and
a wobble sync signal detector for locking said wobble signal and generating a wobble sync signal synchronizing with said wobble signal;
wherein said physical address counter comprises at least a low-bit counter and a high-bit counter, said low-bit counter performing counting according to said clock signal, wherein when said physical address is correctly decoded, said physical address counter is reset to said corresponding decoded physical address, and enables reset and carry of said low-bit counter according to said wobble sync signal, so that the high-bit counter begins counting to generate said reference physical address which is more precise than said decoded physical address.

16. The optical recording device of claim 15, wherein said wobble sync signal detector is a phase-locked loop for locking said wobble signal and adjusting the phase of an output signal based on one period of said reference clock signal as an adjusting unit, to generate said wobble sync signal.

17. The optical recording device of claim 12, wherein said data-interrupt address generator comprises a storage device, and while recording interrupted, an address corresponding to the interrupted place of said data is recoded in the storage device as said data-interrupt address.

18. The optical recording device of claim 12, wherein said data-reconnecting physical address generator generates said data-reconnecting physical address by adding or subtracting a displacement value to said data-interrupt address.

19. The optical recording device of claim 18, wherein if said data-interrupt address is a data-interrupt logical address corresponding to the recorded data on said optical storage medium, then the displacement value generated by said data-reconnecting physical address generator comprises a difference between the logical address corresponding to the recorded data on said optical storage medium and the physical address of said interrupted data.

20. The optical recording device of claim 19, wherein said data-reconnecting physical address generator comprises:
a physical address sync detector for detecting a physical address sync signal pre-grooved on said optical storage medium from a push-pull signal, and generating a first sync signal synchronizing with the physical address of said optical storage medium;
a logical address sync detector for detecting a logical address sync signal of the recorded data on said optical storage medium, and generating a second sync signal synchronizing with the logical address of said optical storage medium; and
a logical/physical address difference detector for detecting time lag between said first sync signal and said second sync signal, and calculating the difference between the logical address and the physical address.

21. The optical recording device of claim 12, wherein said recording-interrupt condition is the condition leading to erroneous record of said storage device, and said recording-interrupt generator comprises a determination unit for detecting said recording-interrupt condition and generating said recording-interrupt signal.

22. The optical recording device of claim 21, wherein said data that are read from a data source and have not yet been recorded on said optical storage medium are temporarily stored in a memory of said recording-interrupt generator, and wherein said recording-interrupt condition arises when the amount of data temporarily stored in said memory is lower than a predetermined threshold value, and said determination unit generates said recording-interrupt signal before the data temporarily stored in said memory decrease to none.

23. An optical recording device for recording a plurality of data on an optical storage medium, generating a data-interrupt address when recording interrupted, and then continuing to reconnect said interrupted data from a data-reconnecting physical address so as to enable further correct reading of said interrupted data, said optical recording device comprising:
a physical addressing module for providing a reference physical address corresponding to a predetermined physical address on said optical storage medium, as a reference while recording said data on said optical storage medium;
a recording-interrupt generator for detecting a recording-interrupt condition, and correspondingly generating a recording-interrupt signal;
a data recording controller for recording said data on said optical storage medium, and suspending recording said data on said optical storage medium when receiving said recording-interrupt signal;
a data-interrupt address generator for generating said data-interrupt address when recording interrupted; and
a data-reconnecting physical address generator for generating said data-reconnecting physical address according to said data-interrupt address, so as to enable the data recording controller, while starting to reconnect said interrupted data, to utilize said data-reconnecting physical address as a starting physical address to record said interrupted data on said optical storage medium, wherein said data-reconnecting physical address is different from the data-interrupt address.

* * * * *